United States Patent
Ito et al.

(10) Patent No.: US 8,744,514 B2
(45) Date of Patent: Jun. 3, 2014

(54) WIRELESS COMMUNICATION DEVICE AND WIRELESS COMMUNICATION METHOD

(75) Inventors: Takayoshi Ito, Yokohama (JP); Koji Akita, Yokohama (JP); Makoto Kamoi, Toda (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/608,870

(22) Filed: Sep. 10, 2012

(65) Prior Publication Data

US 2013/0122890 A1 May 16, 2013

(30) Foreign Application Priority Data

Nov. 11, 2011 (JP) ................................ 2011-247682

(51) Int. Cl.
*H04M 1/00* (2006.01)
(52) U.S. Cl.
USPC .................... 455/550.1; 455/552.1; 455/41.2; 455/418; 348/148
(58) Field of Classification Search
USPC ............ 455/550.1, 552.1, 41.2, 418; 348/148
See application file for complete search history.

(56) References Cited

U.S. PATENT DOCUMENTS

| | | | |
|---|---|---|---|
| 2008/0191892 A1* | 8/2008 | Kirkup et al. | 340/686.6 |
| 2009/0031069 A1 | 1/2009 | Habuto et al. | |
| 2011/0237195 A1* | 9/2011 | Griffin et al. | 455/41.3 |
| 2012/0142379 A1* | 6/2012 | Park | 455/457 |
| 2012/0224827 A1* | 9/2012 | Tano | 386/227 |

FOREIGN PATENT DOCUMENTS

JP    2011-082653 A    4/2011

* cited by examiner

*Primary Examiner* — Danh Le
(74) *Attorney, Agent, or Firm* — Holtz Holtz Goodman & Chick PC

(57) ABSTRACT

A wireless communication device has a first wireless communication unit configured to wirelessly communicate with an external network, a management information storage configured to store application management information received through the first wireless communication unit, a second wireless communication unit configured to wirelessly communicate with an external communication device, and a management unit configured to control, based on the application management information stored in the management information storage, information wirelessly transmitted and received between the second wireless communication unit and the external communication device.

10 Claims, 6 Drawing Sheets

WIRELESS COMMUNICATION DEVICE AND WIRELESS COMMUNICATION METHOD

CROSS REFERENCE TO RELATED APPLICATIONS

This application is based upon and claims the benefit of priority from the prior Japanese Patent Application No. 2011-247682, filed on Nov. 11, 2011, the entire contents of which are incorporated herein by reference.

FIELD

Embodiment of the present invention relate to a wireless communication device for transmitting and receiving management information through wireless communication.

BACKGROUND

Various techniques have been suggested to wirelessly transmit display data from an electronic device such as a PC and a TV tuner to a display device, without using a cable.

However, there is no effective manner for managing the data format of the display data transmitted from the electronic device to the display device.

In recent years, a great number of software programs are executed on various electronic devices, and it is not rare for each user to execute the same software on a plurality of electronic devices. Even though software providers try to manage software licenses on a device-by-device basis, a user may execute the same software on a plurality of electronic devices regardless of license conditions. Further, since the display device of each electronic device is different in screen size and display resolution, the original performance of the software may not be obtained in some electronic devices, thereby deteriorating the performance.

DETAILED DESCRIPTION

According to one embodiment, a wireless communication device has a first wireless communication unit configured to wirelessly communicate with an external network, a management information storage configured to store application management information received through the first wireless communication unit, a second wireless communication unit configured to wirelessly communicate with an external communication device, and a management unit configured to control, based on the application management information stored in the management information storage, information wirelessly transmitted and received between the second wireless communication unit and the external communication device.

Embodiments will now be explained with reference to the accompanying drawings.

First Embodiment

Figure 1:
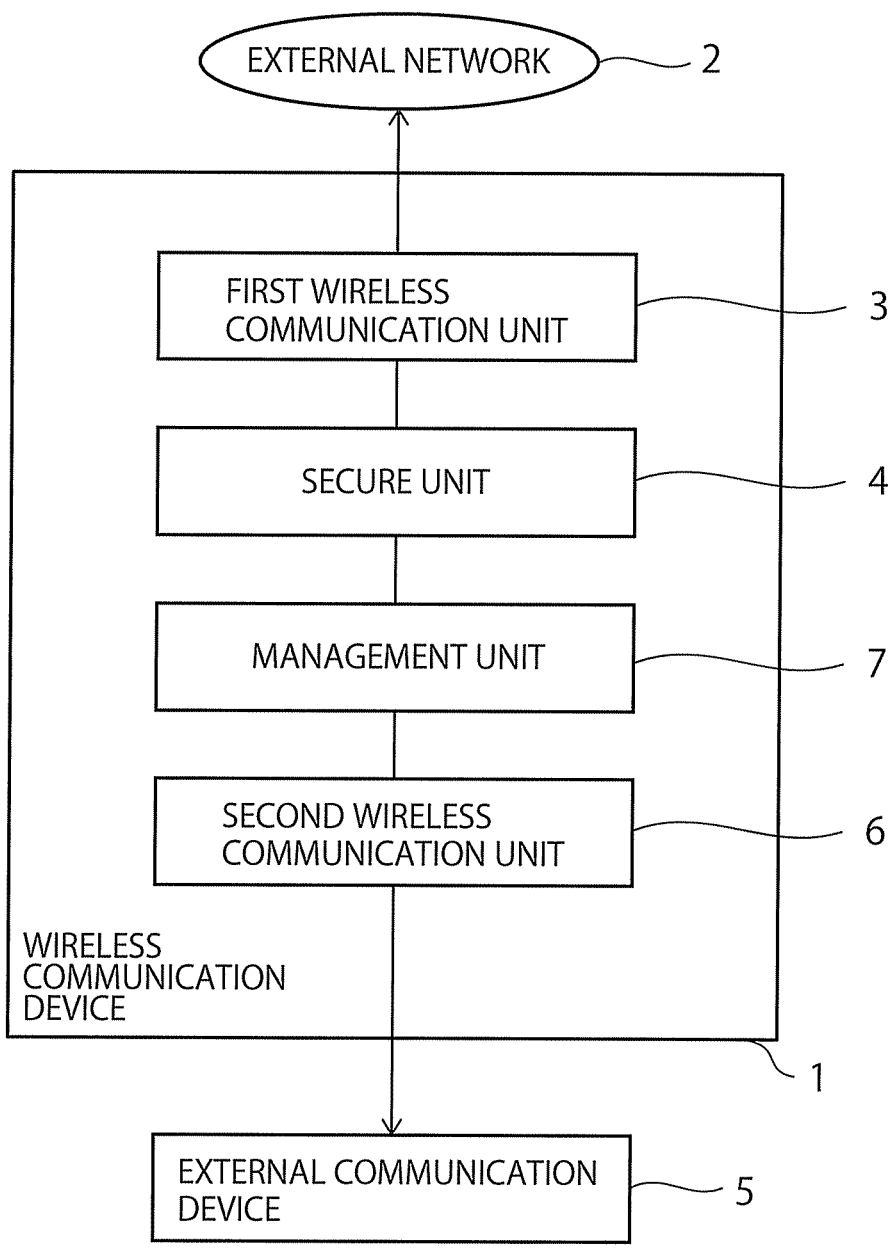
FIG. 1 is a block diagram showing a schematic configuration of a wireless communication device 1 according to a first embodiment.

FIG. 1 is a block diagram showing a schematic configuration of a wireless communication device 1 according to a first embodiment. The wireless communication device 1 of FIG. 1 has a first wireless communication unit 3 which wirelessly communicates with an external network 2, a secure unit (management information storage) 4 which stores application management information received through the first wireless communication unit 3, a second wireless communication unit 6 which wirelessly communicates with an external communication device 5, and a management unit 7 which controls, based on the application management information stored in the secure unit 4, information wirelessly transmitted and received between the second wireless communication unit 6 and the external communication device 5.

Here, an application includes application software executed by the wireless communication device 1 and digital content reproduced by the wireless communication device 1.

The application management information stored in the secure unit 4 is, e.g., license information of each application executed by the wireless communication device 1. More concretely, the application management information includes information concerning license of each application, information concerning data input or output, display resolution of the external communication device 5, transmission speed; connection time of each application, and the usable permission period of each application, for example. In the application management information, highly-confidential information is encrypted and received, while information which is not highly confidential is unencrypted and received, for example, in plaintext.

When the application management information is encrypted by the external network 2 and transmitted to the secure unit 4, there is no fear that the application management information is falsified or abused even when it is illegally acquired by a third party. Accordingly, information can be thoroughly managed by software manufacturers etc.

The secure unit 4 is formed as a single IC chip, and is arranged separately from the other components of the wireless communication device 1. This IC chip is protected by encryption, and includes a key capable of being accessed by only a software manufacturer. Accordingly, the application management information stored in the secure unit 4 can be updated only by the software manufacturer having the key. Further, since the secure unit 4 is made by a dedicated IC chip, it is possible to surely prevent that the application management information stored in the secure unit 4 is read without permission and illegally used.

The management unit 7 controls whether or not to input/output data from/into the external communication device 5, with reference to the application management information. The first wireless communication unit 3 performs control for storing the application management information supplied from the external network 2 in the secure unit 4, and updating the application management information in the secure unit 4.

The first wireless communication unit 3 performs medium- to long-range wireless communication such as cellular communication and wireless LAN (Wi-Fi), or performs short-range wireless communication such as NFC (Near Field Communication). The second wireless communication unit 6 performs medium-range wireless communication such as wireless LAN (Wi-Fi), or performs short-range wireless communication such as Bluetooth (registered trademark), NFC, TransferJet, and millimeter-wave communication. As stated above, it is assumed that the communication range of the first wireless communication unit 3 is broader than the communication range of the second wireless communication unit 6.

Figure 2:
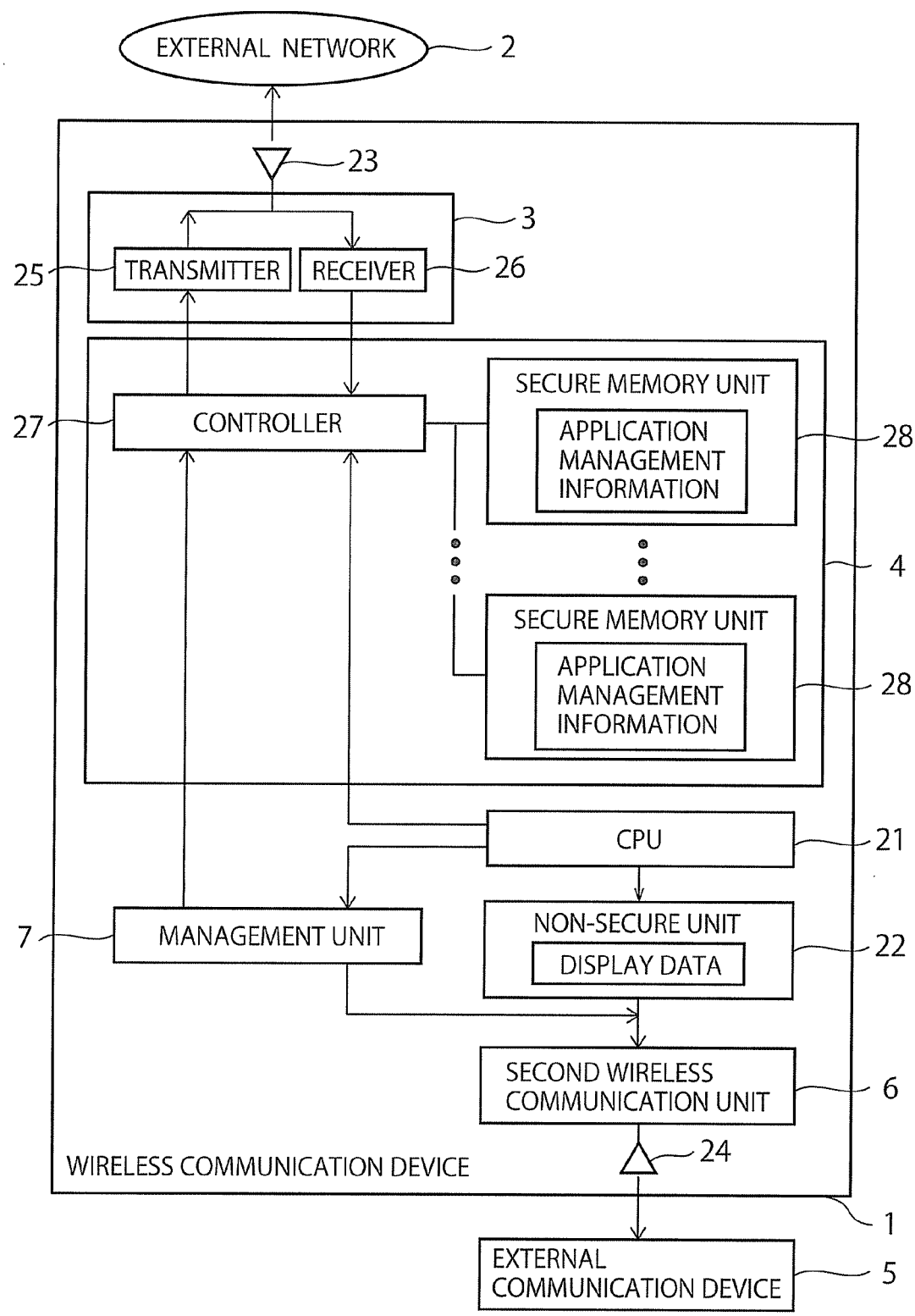
FIG. 2 is a block diagram showing the internal configuration of the wireless communication device 1 of FIG. 1 in more detail.

FIG. 2 is a block diagram showing the internal configuration of the wireless communication device 1 of FIG. 1 in more detail. FIG. 2 shows an example where the wireless communication device 1 transmits display data to the external communication device 5 through the second wireless communication unit 6. In addition to the first wireless communication unit 3, secure unit 4, second wireless communication unit 6, and management unit 7 shown in FIG. 1, the wireless communication device 1 of FIG. 2 has a CPU 21 which controls the secure unit 4 and management unit 7, and a non-secure unit 22 which stores the display data. The wireless communication device 1 of FIG. 2 further has a first antenna 23 used when the first wireless communication unit 3 performs wireless communication, and a second antenna 24 used when the second wireless communication unit 6 performs wireless communication.

The first wireless communication unit 3 of FIG. 2 has a transmitter 25 and a receiver 26. The secure unit 4 has a controller 27 and a plurality of secure memory units 28. Each secure memory unit 28 is a memory area which is protected by access restriction and arranged corresponding to each application.

The non-secure unit 22 is a magnetic recording device such as an HDD (Hard Disk Drive) or a semiconductor storage device such as a main memory, and can be arbitrarily accessed by a user. This is the difference from the secure unit 4. The non-secure unit 22 stores, e.g., display data transmitted to the external communication device 5. The display data is data for displaying, e.g., the window screen of each application and the desktop screen of an OS.

Figure 3:
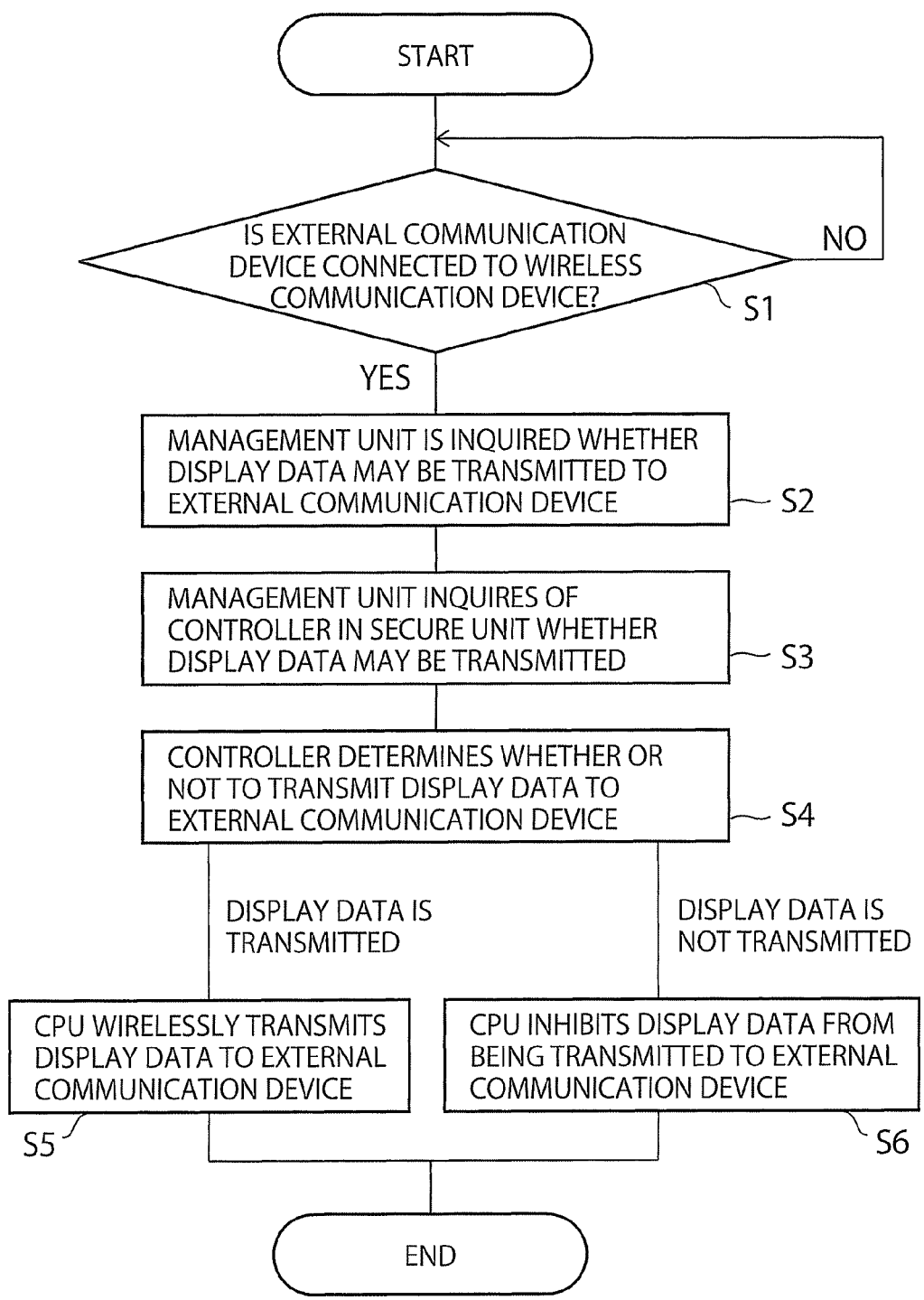
FIG. 3 is a flow chart showing an example of the processing steps for transmitting display data to an external communication device 5 by using the wireless communication device 1 of FIG. 2.

FIG. 3 is a flow chart showing an example of the processing steps for transmitting the display data to the external communication device 5 by using the wireless communication device 1 of FIG. 2. First, whether the external communication device 5 is connected to the wireless communication device 1 is detected by a user action or a sensor (not shown) (Step S1).

When the connection of the external communication device 5 is detected, the CPU 21 inquires of the management unit 7 whether the display data stored in the non-secure unit 22 may be transmitted to the external communication device 5 (Step S2). The management unit 7 may be formed as an IC separated from the non-secure unit 22 as shown in FIG. 1 and FIG. 2, or may be integrated with the non-secure unit 22 to function as software.

In response to the inquiry from the CPU 21, the management unit 7 inquires of the controller 27 in the secure unit 4 whether the display data may be transmitted (Step S3). The controller 27 reads, from the secure memory unit 28 in the secure unit 4, license information etc. corresponding to the application currently being executed by the wireless communication device 1, and determines whether or not to transmit the display data to the external communication device 5 (Step S4).

When the controller 27 determines to transmit the display data to the external communication device 5, the CPU 21 wirelessly transmits the display data stored in the non-secure unit 22 to the external communication device 5 through the second wireless communication unit 6 (Step S5). On the other hand, when the controller 27 determines not to transmit the display data to the external communication device 5, the CPU 21 inhibits the display data from being transmitted to the external communication device 5 (Step S6).

Based on the instruction by the CPU 21, the application management information of each application to be stored in each secure memory unit 28 in the secure unit 4 is acquired from the external network 2. Based on the instruction by the CPU 21, the transmitter 25 in the first wireless communication unit 3 requests the latest management information from the external network 2 through the first antenna 23. The latest management information transmitted from the external network 2 in response to this request is received by the receiver 26 in the first wireless communication unit 3 through the first antenna 23, and overwritten and updated in the corresponding secure memory unit 28, based on the instruction by the CPU 21.

As stated above, in the first embodiment, output of the display data to the external communication device 5 is controlled in accordance with the application management information transmitted from the external network 2 and received by the wireless communication device 1. The application management information includes default license information of the application running on the wireless communication device 1 and optimization information about hardware performance of the wireless communication device 1, for example.

The CPU 21 in the wireless communication device 1 determines how to output the display data to the external communication device 5, based on various information included in the application management information, such as information concerning whether the display data may be outputted to the external communication device 5, display resolution, transmission speed, and the existence or nonexistence of optional functions.

In the first embodiment, since the wireless communication device 1 transmits the display data to the external communication device 5 through wireless communication, there is no need to arrange a connector and an interface required for wired communication. Accordingly, problems such as connector breakage, bad connection, aged deterioration, and short circuit are not caused, thereby reducing component cost and maintenance cost, and improving usability since there is no need to attach and remove a connector.

Further, in the first embodiment, wireless communication with the external network 2 is performed through the first wireless communication unit 3, and wireless communication with the external communication device 5 is performed through the second wireless communication unit 6. Accordingly, optimum information can be provided to the external communication device 5 without violating license conditions of each application or deteriorating application performance.

Second Embodiment

A second embodiment detects in advance which functions the external communication device 5 has, and adjusts the data format of the display data to be transmitted to the external communication device 5 in accordance with the detected functions.

Figure 4:
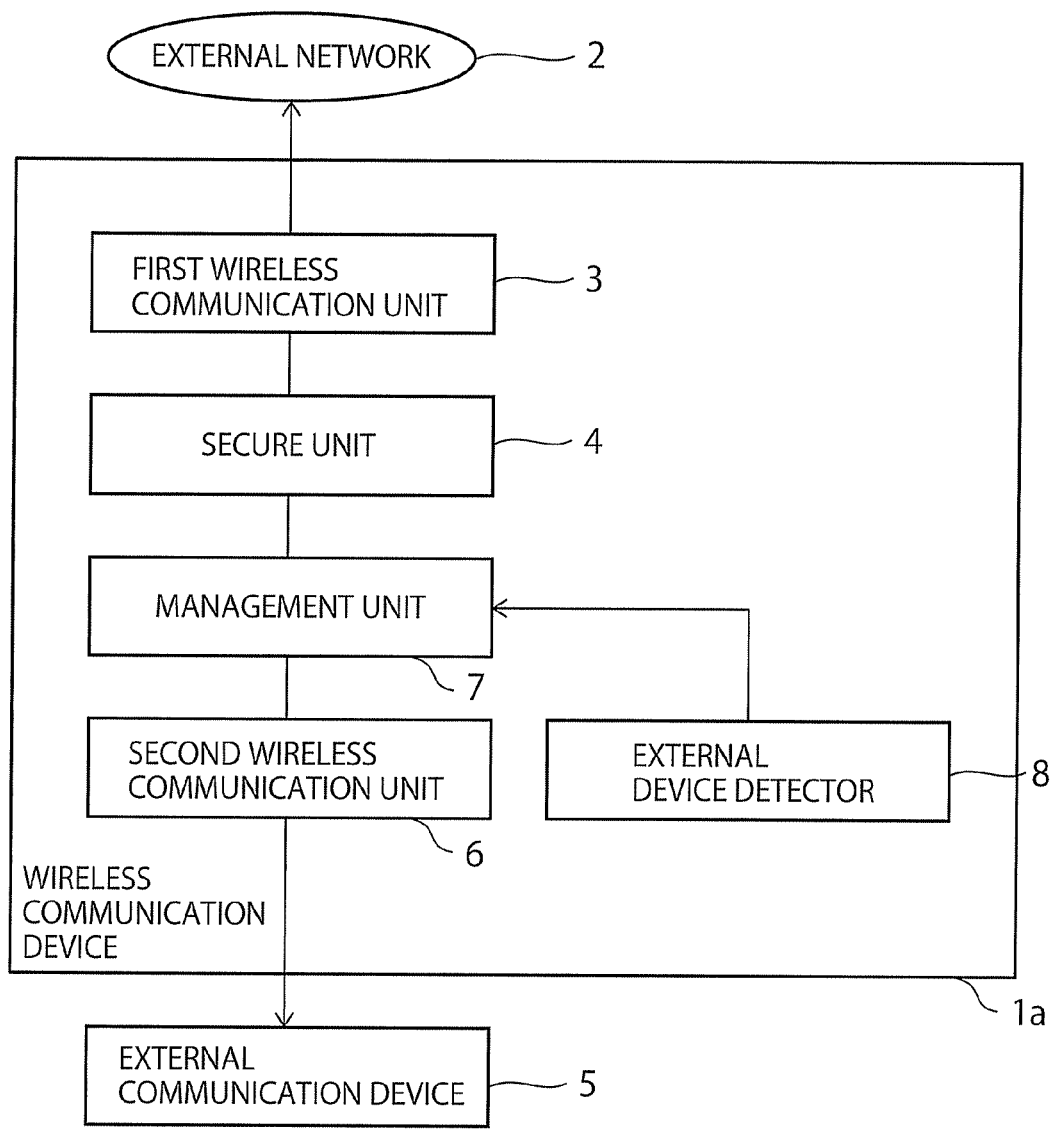
FIG. 4 is a block diagram showing a schematic configuration of a wireless communication device 1a according to a second embodiment.

FIG. 4 is a block diagram showing a schematic configuration of a wireless communication device 1a according to the second embodiment. In FIG. 4, the same components as those in FIG. 1 are given the same symbols, and differences therebetween will be mainly explained.

In addition to the components of the wireless communication device 1 of FIG. 1, the wireless communication device 1a of FIG. 4 has an external device detector 8. The external device detector 8 detects whether the external communication device 5 is connected to the wireless communication device 1a, and detects which functions are provided to the external communication device 5. Here, the functions mean, e.g., the display resolution and the number of displayable colors of the external communication device 5. The functional information detected by the external device detector 8 is transmitted to the management unit 7. The management unit 7 controls the information transmitted and received between the second wireless communication unit 6 and the external communication device 5, based on the application management information stored in the secure unit 4 and the functional information of the external communication device 5.

For example, when the display data is transmitted to an external communication device 5 such as a smartphone having a low display resolution, the wireless communication device 1a compresses the display data to reduce its data volume, and then transmits it to the external communication device 5. In this way, the display data can be wirelessly transmitted at high speed while achieving power saving.

Further, when the external device detector 8 detects that the external communication device 5 is connected to the wireless communication device 1a, the management unit 7 starts the processing referring to the application management information in the secure unit 4, while when the external device detector 8 detects that the external communication device 5 is removed from the wireless communication device 1a, the management unit 7 stops transmitting the display data to the external communication device 5.

As stated above, in the second embodiment, since the external device detector 8 previously detects which functions are provided to the external communication device 5, display data suitable for the functions of the external communication device 5 can be transmitted from the second wireless communication unit 6 to the external communication device 5, thereby increasing the speed of wireless transmission while reducing power consumption. Further, since the external device detector 8 detects whether the external communication device 5 is connected to the wireless communication device 1a, wireless communication with the external communication device 5 can be performed only while the external communication device 5 is being connected, thereby saving more power.

Third Embodiment

A third embodiment is provided with an electromagnetic coupling unit to perform wireless communication using power obtained through electromagnetic induction.

Figure 5:
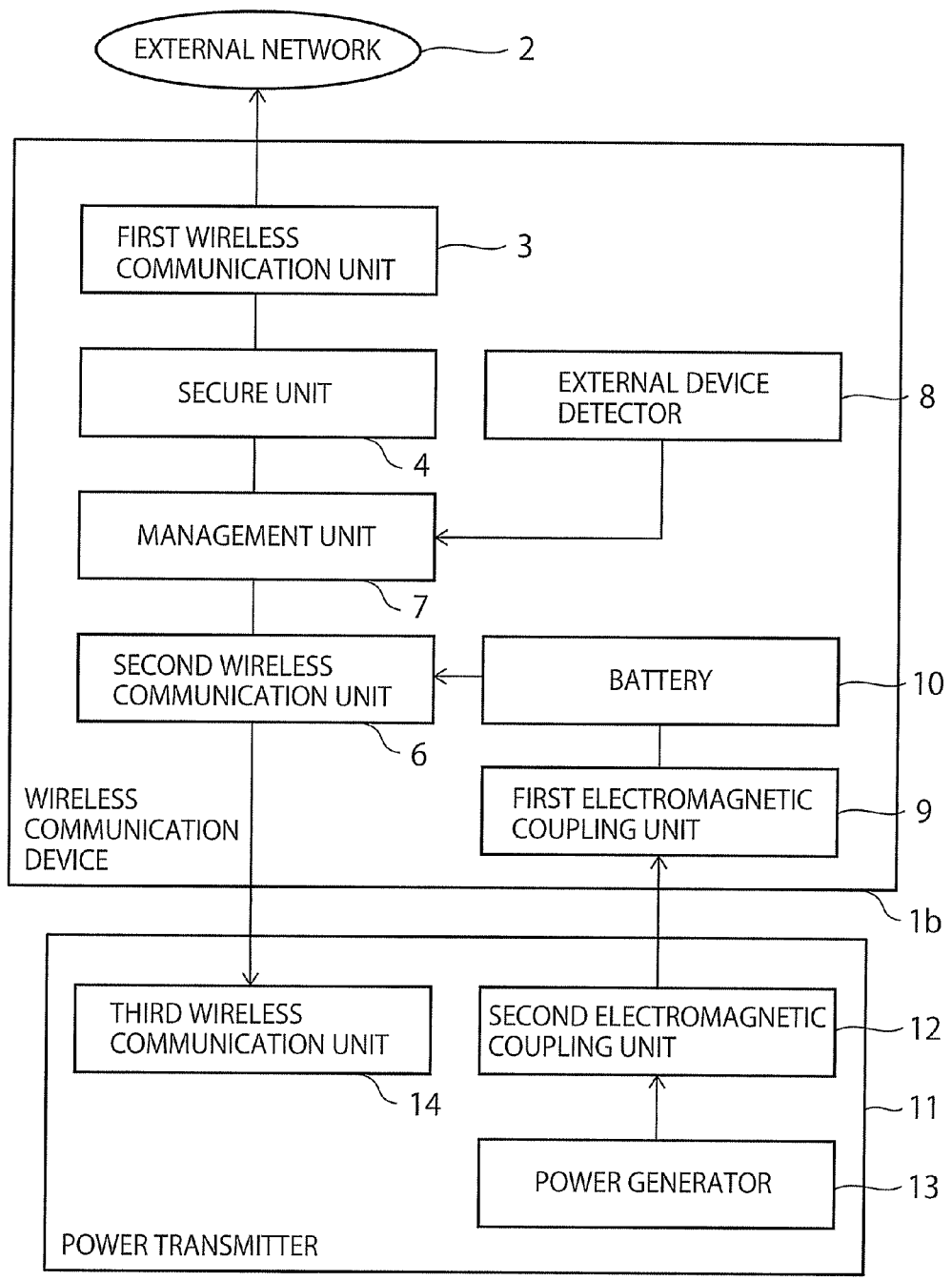
FIG. 5 is a block diagram showing a schematic configuration of a wireless communication device 1b according to a third embodiment.

FIG. 5 is a block diagram showing a schematic configuration of a wireless communication device 1b according to the third embodiment. In addition to the components of FIG. 4, the wireless communication device 1b of FIG. 5 has a first electromagnetic coupling unit 9 and a battery 10.

The first electromagnetic coupling unit 9 is, e.g., a coil which generates power through electromagnetic induction. The battery 10 is a secondary battery which can be charged with the power generated by the first electromagnetic coupling unit 9. Each of the first wireless communication unit 3 and the second wireless communication unit 6 performs wireless communication using the power of the battery 10.

The wireless communication device 1b of FIG. 5 receives power from a power transmitter 11 arranged within a proximal distance enough to cause electromagnetic induction, and wirelessly communicates with the power transmitter 11 through the second wireless communication unit 6.

As shown in FIG. 5, the power transmitter 11 has a second electromagnetic coupling unit 12, a power generator 13, and a third wireless communication unit 14. The second electromagnetic coupling unit 12 is magnetically coupled with the first electromagnetic coupling unit 9, and transmits power to the first electromagnetic coupling unit 9 through electromagnetic induction. The second electromagnetic coupling unit 12 is a coil, for example. The power generator 13 generates an alternating current signal, and supplies it to the second electromagnetic coupling unit 12. The third wireless communication unit 14 wirelessly communicates with the second wireless communication unit 6.

As stated above, when the power transmitter 11 is arranged in proximity, the wireless communication device 1b of FIG. 5 receives power from the power transmitter 11 through the first electromagnetic coupling unit 9. The received power is charged in the battery 10. Further, when the power transmitter 11 is arranged in proximity, the second wireless communication unit 6 in the wireless communication device 1b of FIG. 5 can wirelessly communicate with the third wireless communication unit 14 in the power transmitter 11.

The second wireless communication unit 6 according to the first and second embodiments performs medium-range wireless communication or short-range wireless communication, while the second wireless communication unit 6 according to the present embodiment is premised on performing short-range wireless communication, because electromagnetic induction is not caused when the power transmitter 11 is not arranged within a proximal distance.

The first wireless communication unit 3 in the wireless communication device 1 of FIG. 5 wirelessly communicates with the external network 2. The first wireless communication unit 3, management unit 7, secure unit 4, and external device detector 8 operate similarly to those of FIG. 4.

As stated above, in the third embodiment, since the first electromagnetic coupling unit 9 and the battery 10 are arranged in the wireless communication device 1, the battery 10 can be charged with power received from the power transmitter 11 arranged within a proximal distance, and each of the first wireless communication unit 3 and the second wireless communication unit 6 can perform wireless communication using the power charged in the battery 10. Accordingly, the second wireless communication unit 6 for performing short-range wireless communication can perform wireless communication only with the power from the power transmitter 11. Depending on the situation, the first wireless communication unit 3 can also perform wireless communication only with the power from the power transmitter 11.

Fourth Embodiment

A fourth embodiment is characterized in the arrangement of the first electromagnetic coupling unit 9 and the second wireless communication unit 6. Since the wireless communication device 1 in the fourth embodiment is configured similarly to that of FIG. 5, differences therebetween will be mainly explained.

Figure 6:
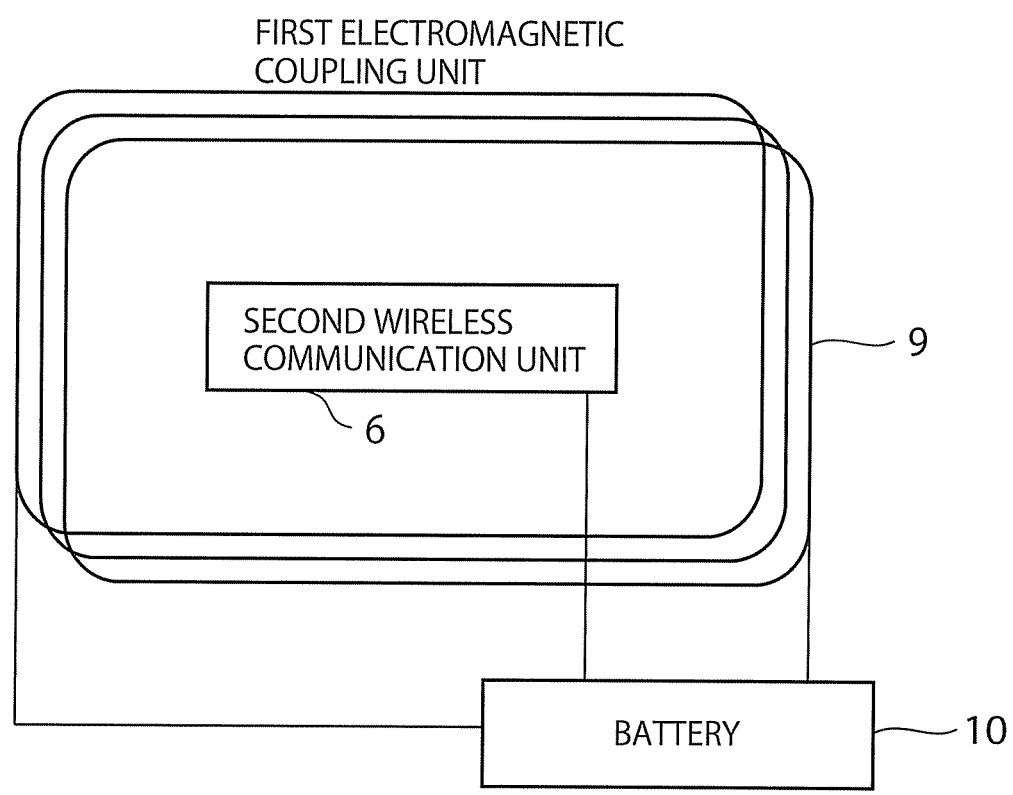
FIG. 6 is a diagram showing an arrangement of a first electromagnetic coupling unit 9 and a second wireless communication unit 6 according to a fourth embodiment.

FIG. 6 is a diagram showing an arrangement of the first electromagnetic coupling unit 9 and the second wireless communication unit 6 according to the fourth embodiment. As shown in FIG. 6, the first electromagnetic coupling unit 9 is arranged to surround the second wireless communication unit 6. In the example shown in FIG. 6, a coil forming the first electromagnetic coupling unit 9 is wound into nearly a rectangular shape, and the second wireless communication unit 6 is arranged at nearly the center of the coil. Note that a concrete shape of the coil is not limited to a rectangular shape, and the position of the second wireless communication unit 6 may be shifted from the center of the coil. However, it is undesirable that the second wireless communication unit 6 is arranged outside the coil. This is because it is most desirable to arrange the second wireless communication unit 6 inside the first electromagnetic coupling unit 9 when the wireless communication device is a mobile electronic device such as a smartphone, in order to realize that when this wireless communication device is brought close to the power transmitter 11, power is transmitted through electromagnetic induction and the second wireless communication unit 6 wirelessly communicates with the third wireless communication unit 14 stably.

As stated above, in the fourth embodiment, since the second wireless communication unit 6 is arranged inside the first electromagnetic coupling unit 9, it is guaranteed to let the second wireless communication unit 6 wirelessly communicate with the third wireless communication unit 14 stably while transmitting power between the first electromagnetic coupling unit 9 and the second electromagnetic coupling unit 12.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication device comprising:
  a first wireless communication unit configured to wirelessly communicate with an external network;
  a management information storage configured to store application management information received through the first wireless communication unit;
  a second wireless communication unit configured to wirelessly communicate with an external communication device; and
  a management unit configured to control, based on the application management information stored in the management information storage, information wirelessly transmitted and received between the second wireless communication unit and the external communication device,
  wherein the application management information stored in the management information storage includes at least one of license information of an application, the license information being received through the first wireless communication unit, and optimization information for executing the application in an optimized state.

2. The device of claim 1, wherein the first wireless communication unit performs medium- to long-range wireless communication or short-range wireless communication, and the second wireless communication unit performs medium-range wireless communication or short-range wireless communication.

3. The device of claim 1, wherein a communication range of the first wireless communication unit is broader than a communication range of the second wireless communication unit.

4. A wireless communication device comprising:
  a first wireless communication unit configured to wirelessly communicate with an external network;
  a management information storage configured to store application management information received through the first wireless communication unit;
  a second wireless communication unit configured to wirelessly communicate with an external communication device; and
  a management unit configured to control, based on the application management information stored in the management information storage, information wirelessly transmitted and received between the second wireless communication unit and the external communication device,
  wherein the management unit controls at least one of whether or not to output information to the external communication device through the second wireless communication unit, transmission speed of the information, display resolution of display data included in the information, and a number of display colors of the display data, the control being performed depending on functions of the external communication device.

5. The device of claim 4, wherein a communication range of the first wireless communication unit is broader than a communication range of the second wireless communication unit.

6. A wireless communication device comprising:
  a first wireless communication unit configured to wirelessly communicate with an external network;
  a management information storage configured to store application management information received through the first wireless communication unit;
  a second wireless communication unit configured to wirelessly communicate with an external communication device;
  a management unit configured to control, based on the application management information stored in the management information storage, information wirelessly transmitted and received between the second wireless communication unit and the external communication device; and
  an external device detector configured to detect whether the external communication device is connected, and to acquire functional information of the external communication device,
  wherein the management unit controls information transmitted to the external communication device through the second wireless communication unit, based on the functional information of the external communication device acquired by the external device detector.

7. The device of claim 6, wherein the management unit permits wireless communication with the external communication device only while the external device detector detects that the external communication device is being connected.

8. The device of claim 6, wherein the functional information of the external communication device acquired by the external device detector includes at least one of display resolution and a number of display colors of display data displayable on the external communication device.

9. A wireless communication device comprising:
  a first wireless communication unit configured to wirelessly communicate with an external network;

a management information storage configured to store application management information received through the first wireless communication unit;

a second wireless communication unit configured to wirelessly communicate with an external communication device;

a management unit configured to control, based on the application management information stored in the management information storage, information wirelessly transmitted and received between the second wireless communication unit and the external communication device;

an electromagnetic field coupling unit configured to acquire power transmitted from the external communication device through electromagnetic induction; and a charger configured to charge the power acquired by the electromagnetic field coupling unit, and to supply the charged power to the first wireless communication unit and the second wireless communication unit, wherein the first wireless communication unit and the second wireless communication unit perform wireless communication using the power charged in the charger.

10. The device of claim 9, wherein the electromagnetic field coupling unit comprises an annular conductive member arranged to surround the second wireless communication unit, and configured to flow inductive current due to electromagnetic induction.

\* \* \* \* \*